Sept. 5, 1944.	E. C. KLEPP	2,357,524
ELECTRIC RATIOMETER
Filed April 9, 1942
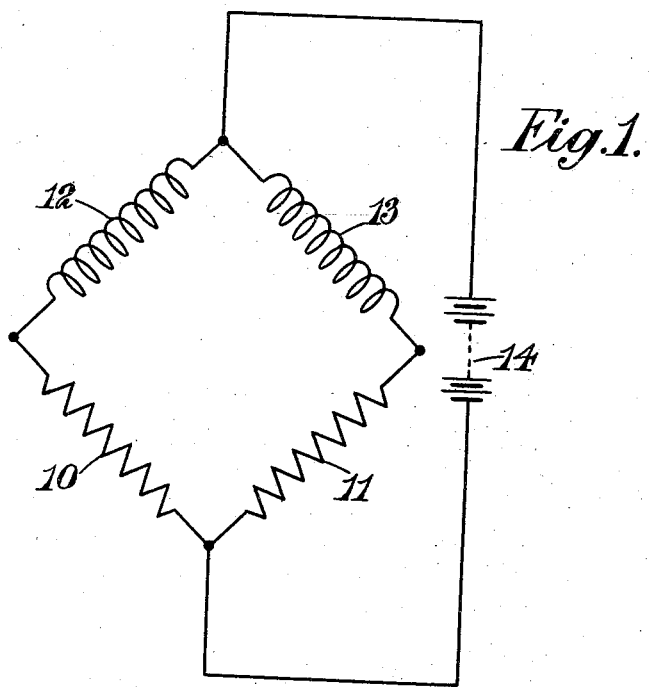
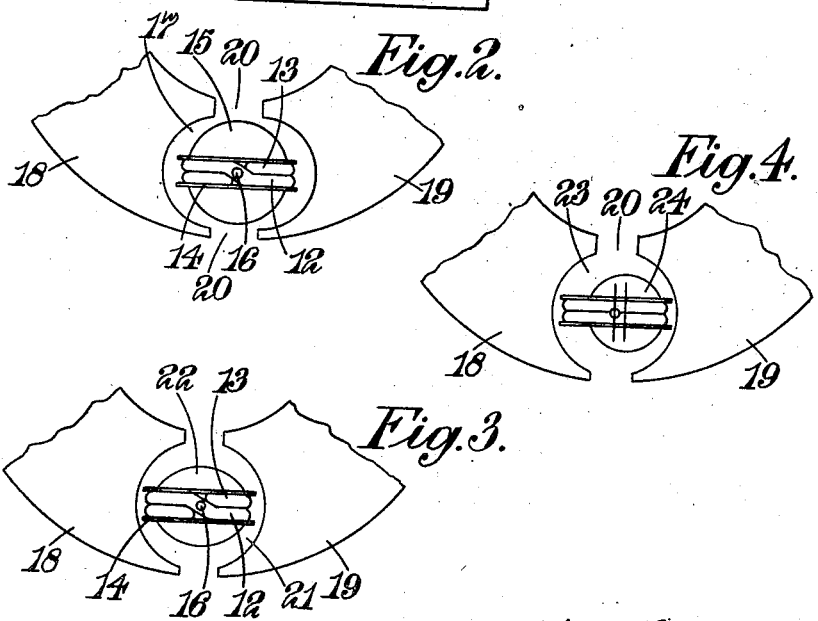
Edwin C. Klepp
By Watson, Cole, Grindle
  & Watson
ATTYS Patented Sept. 5, 1944

2,357,524

UNITED STATES PATENT OFFICE 2,357,524

ELECTRIC RATIOMETER

Edwin Claude Klepp, London, England, assignor to S. Smith & Sons (Motor Accessories) Limited, London, England, a British company Application April 9, 1942, Serial No. 438,329
In Great Britain December 9, 1940

4 Claims. (Cl. 171—95)

This application corresponds to the application of Edwin Claude Klepp and S. Smith & Sons (Motor Accessories) Limited, Serial No. 17,474/40, which was filed in Great Britain on December 9, 1940.

This invention relates to electric ratiometers of the kind comprising two coils together rotatable in a field and adapted to be connected in circuit with two impedances respectively and with an electric source, the coils being wound to produce opposing torques so that an indication of the ratio of the impedances is obtained by the amount of rotation of the coils due to the resultant torque.

In known ratiometers of this kind the coils are arranged to move in a field of substantially uniform strength against the action of a restoring spring and this arrangement has the disadvantage that any variation of the voltage of the supply will vary the resultant torque and affect the response of the ratiometer. The object of the invention is to provide a ratiometer which is substantially independent of voltage variations.

According to this invention there is provided a ratiometer of the kind referred to in which the coils which produces the opposing torque are arranged to move through a magnetic field, the intensity of which varies along the path traversed by the coils, which coils are so relatively disposed and shaped that, at any location throughout their movement, they are respectively disposed in different field strengths, whereby for a given ratio of currents flowing through them, they will move to that location where the opposing torques resulting respectively from the different current densities and the different field strengths balance one another. The currents in the coils depend upon the values of the aforesaid impedances so that the coils will move to a position dependent on the ratio of these impedances, that is to say, to a position in which the inverse ratio of the field strength in which the coils are located is equal to the ratio of the impedances connected to the coils. It will be appreciated that the ratio of the currents in the coils is not affected by variations in the supply of voltage, and consequently, the positions of the coils are not affected by such voltage variations. It will further be appreciated that with the arrangement according to the present invention no restoring spring is necessary but a light spring may be provided merely for returning the coil system to a zero or datum position.

In one specific construction of instrument according to the invention the required magnetic field may be provided by the opposed pole-pieces of a magnet shaped to form between them a space which is elliptical in planes at right-angles to an axis disposed midway between them, and by a cylindrical core arranged coaxially with said axis and which aforesaid coils are shaped to extend across the ends of the core and each has axially extending stretches diametrically disposed on opposite sides of the core, the adjacent stretches of the two coils being arranged side by side and thus being disposed in different field strengths.

With this arrangement the strength of the flux in the air gap around the core increases from a minimum at the major axis of the ellipse in both directions to a maximum at the minor axis of the ellipse.

Preferably, the two sets of coils are mounted around the core in planes including the axis of rotation and supported on a former pivoted so as to rotate independently of the core in the air gap. The major axis of the elliptical space extends at right-angles to the plane of the gap between the pole-pieces.

As indicated above, the coils are connected in series with two impedances and a common electric supply. Thus, when the resistances are equal and therefore have a 1:1 ratio, the currents from the coils will also be equal and the coil system will take up a position in which the coils are in the parts of the air gap in which the field strength at the coils is equal. That is to say, the coil system will take up a position corresponding with the major axis of the elliptical pole-pieces. If now, the ratio of the impedances is changed in either sense the coil system will move in a corresponding direction to a position in which the field strength at the different locations of the coils has a like but inverse ratio to that of the impedances so as to provide an indication of that ratio.

In an alternative form of construction the required magnetic field is provided by opposed pole-pieces of a magnet shaped to provide between them a cylindrical space and by a fixed core which is elliptical in section across an axis disposed coaxially with the axis of the cylindrical space, wherein the coils are shaped to extend across the end of the core and each have axially extending stretches on opposite sides of the core and diametrically disposed in respect of the circumferential space, the adjacent stretches of the two coils being arranged side by side and thus in different field strengths. The major axis of said elliptical core is disposed at right-angles to the plane of the gap between the pole-pieces.

In yet a further alternative construction the magnetic field is produced by opposed pole-pieces of the magnet shaped to provide between them a cylindrical space and by a fixed cylindrical core disposed with its axis parallel to and spaced to one side of the axis of the cylindrical space so as to provide a gap between it and the pole-pieces, wherein the coils are disposed with their axis parallel to and spaced to one side of the axis of the cylindrical core, which coils are disposed with their planes parallel with but on opposite sides of the axis of the core. In this case, said axes are spaced apart in a plane at right-angles to the plane of the gap between said pole-pieces.

The following is a description of three alternative forms of construction according to this invention, reference being made to the accompanying drawing, in which:

Figure 1 shows a diagram of the electrical connection;

Figure 2 shows the pole-pieces of a magnet and a cylindrical core mounted between them, the pole-pieces being shaped to provide an elliptical space;

Figure 3 is a similar view to Figure 2, but showing an arrangement in which the pole-pieces provide a cylindrical space and the core is elliptical in shape, and Figure 4 is a similar view to Figure 2 in which the pole-pieces provide a cylindrical space between them and a cylindrical core disposed in that space with its axis to one side of the axis of cylindrical space.

Referring to Figure 1, the impedances, the ratios of which are to be indicated, are shown at 10 and 11, the ends of these impedances being connected to the ends of two similar coils 12 and 13 respectively. The other ends of the impedances are connected to a source of supply 14, as are also the other ends of the coils 12 and 13. It will thus be seen that when the impedances 10 and 11 are of the same value the same currents will be flowing through the two coils 12 and 13 irrespective of the potentials spaced across the system.

As shown in Figure 2, the coils 12 and 13 are wound on a former 14 which encircles a cylindrical core 15 of soft iron, so that the coils pass over the ends of the core and axially along opposite sides thereof. Each coil is so shaped that the stretches on opposite sides of the core are diametrically disposed. The former 14 is pivotally mounted at 16 to rotate about the axis of the core. The cylindrical core is disposed in an elliptical space 17 formed between the two pole-pieces 18 and 19 of a permanent magnet. The plane of the gap 20 between the pole-pieces is arranged at right-angles to the major axis of the ellipse. The torque applied to each coil is the product of the ampere turns in the coil and the field strength in which the coil is located. Since the two coils are disposed side by side they will be located in different field strengths except when they lie equally on either side of the major or minor axes of the ellipse in a neutral position. The system provided by the two coils will be in equilibrium when the torques, which are in opposition to one another, are equal. This condition prevails when the ratio of the two field strengths in which the coils are respectively situated becomes equal to the inverse ratio of the currents flowing through the coils. It will therefore be seen that if the coils are to take up different positions for different ratios of currents flowing through them the ratios of the field strengths must vary along the path of travel of the coils, otherwise the ratio of the field strength to which the coils are subjected would always be the same along said path.

It will be noted in Figure 2, that the field strength increases towards the points of reversal, that is, the points 20 where the field strength becomes zero, and thus will cause instability at these points. To overcome this the construction shown in Figure 3 is adopted. Here the pole-pieces 18 and 19 provide a cylindrical space 21 between them and the core 22 is elliptical in cross-section. Consequently, the field strength decreases towards the points of reversal and instability at these points is removed. In the arrangement shown in Figure 4, the space 23 between the poles of the magnet, and also the core 24 are cylindrical, but the axis of the core is disposed to one side of the axis of the cylindrical space in a plane at right-angles to the gap 20 between the pole-pieces. This results in simplification of construction.

In any of the arrangements referred to above the former may be provided with a pointer traversing a suitably calibrated scale, a light zeroising spring being provided to return the former to a neutral position.

I claim:

1. A ratiometer comprising two coils, two like impedances intended for comparison and connected respectively in series therewith, means for connecting both sets of coils and impedances across a source of potential whereby the coils are energized in inverse ratio to the resistances of said impedances, a mounting for said coils only, means pivoting said mounting for rotation about an axis transverse to the axes of the coils, means for producing a magnetic field the intensity of which varies along the path traversed by the coils, said coils being so relatively disposed and shaped that at any location throughout their movement their side stretches are arranged side by side and are respectively located in different field strengths with the stretches of one coil in weaker fields than those of the other, said coils being connected to produce opposite torques on said mounting, whereby for given ratio of current flowing through them, they will move to that location where the electromotive forces resulting respectively from the different current densities and the different field strengths balance one another.

2. A ratiometer comprising opposed pole pieces of a magnet spaced apart and shaped to form between them a space which is elliptical in planes at right angles to an axis midway between them, a cylindrical core arranged coaxially with said axis so as to provide a gap of varying width between it and the pole pieces, two coils encircling said core and disposed with the side stretches of their convolutions contiguous and in said gap, two impedances intended for comparison and connected respectively in series with the coils, means for connecting both sets of coils and impedances whereby the coils are energized in inverse ratio to the resistances of said impedances in shunt across a common source of potential, a mounting for said coils, means pivoting said mounting for rotation about the axis of the core, which coils are so relatively disposed and shaped that at any location throughout their movement, their side stretches are side by side and are respectively located at different field strengths in said gap both stretches of one coil being always in a weaker field than the stretches of the other, said coils being connected to produce opposite torques on said mounting whereby for given ratio of currents flowing through them they will move to that location where the electromotive forces resulting respectively from the different current densities and the different field strengths balance one another.

3. A ratiometer comprising magnets having opposed pole pieces spaced apart and shaped to provide between them a cylindrical space, a fixed core which is elliptical in section across an axis disposed coaxially with the axis of the cylindrical space, the major axis of which ellipse extends from opposite the centre of one pole to the other, two coils encircling said core, two impedances intended for comparison and connected respectively in series with the coils, means for connecting both sets of coils and impedances in shunt across a common source of potential whereby the coils are energized in inverse ratio to the resistances of the impedances, a mounting for said coils, means pivoting said mounting for rotation about the axis of the core, which coils are so relatively disposed and shaped that at any location throughout their movement their side stretches are arranged side by side and are respectively located at such different field strengths in said gap that one coil is subject to a weaker field than the other, said coils being connected to produce opposite torques on said mounting whereby for given ratio of currents flowing through them they will move to that location where the electromotive forces resulting respectively from the different current densities and the different field strengths balance one another.

4. A ratiometer comprising a magnet having opposed pole pieces shaped to provide between them a cylindrical space, a fixed cylindrical core disposed with its axis parallel to and spaced to one side of the axis of the cylindrical space in a plane passing through the centres of the pole pieces so as to provide a gap of varying width, two coils surrounding said core and disposed in spaced planes parallel with and on opposite sides of the axis of the core, two impedances intended for comparison and connected respectively in series with the coils, means for connecting both sets of coils and impedances in shunt across a common source of potential whereby the coils are energized in inverse ratio to the resistances of the impedances, a mounting for said coils, means pivoting said mounting for rotation about an axis transverse to the axes of the coils, which coils are so relatively disposed and shaped that at any location throughout their movement their side stretches are arranged side by side and are respectively located in different field strengths with the stretches of one coil in weaker fields than those of the other, said coils being connected to produce opposite torques on said mounting, whereby for given ratio of current flowing through them, they will move to that location where the electromotive forces resulting respectively from the different current densities and the different field strengths balance one another.

EDWIN CLAUDE KLEPP.